US009194016B2

(12) United States Patent
Okubo et al.

(10) Patent No.: US 9,194,016 B2
(45) Date of Patent: Nov. 24, 2015

(54) ANNEALING SEPARATOR FOR GRAIN-ORIENTED ELECTROMAGNETIC STEEL SHEET

(71) Applicant: JFE Steel Corporation, Tokyo (JP)

(72) Inventors: Tomoyuki Okubo, Tokyo (JP); Makoto Watanabe, Tokyo (JP); Takashi Terashima, Tokyo (JP)

(73) Assignee: JFE Steel Corporation (JP)

( * ) Notice: Subject to any disclaimer, the term of this patent is extended or adjusted under 35 U.S.C. 154(b) by 63 days.

(21) Appl. No.: 14/348,963

(22) PCT Filed: Oct. 4, 2012

(86) PCT No.: PCT/JP2012/006375
§ 371 (c)(1),
(2) Date: Apr. 1, 2014

(87) PCT Pub. No.: WO2013/051270
PCT Pub. Date: Apr. 11, 2013

(65) Prior Publication Data

US 2014/0246124 A1 Sep. 4, 2014

(30) Foreign Application Priority Data

Oct. 4, 2011 (JP) ................................ 2011-220486

(51) Int. Cl.
*C04B 35/03* (2006.01)
*C04B 35/04* (2006.01)
(Continued)

(52) U.S. Cl.
CPC .. *C21D 1/68* (2013.01); *C21D 8/12* (2013.01); *C21D 8/1283* (2013.01); *C22C 38/00* (2013.01);
(Continued)

(58) Field of Classification Search
CPC ...... C04B 35/04; C04B 35/043; C04B 35/053
USPC ................................................ 501/108, 111
See application file for complete search history.

(56) References Cited

U.S. PATENT DOCUMENTS 4,537,792 A * 8/1985 Kitayama et al. ............ 427/473
6,280,534 B1 * 8/2001 Senda et al. ................. 148/113
(Continued)

FOREIGN PATENT DOCUMENTS

EP 0 164 828 A2 12/1985
EP 0 789 093 A1 8/1997
(Continued)

OTHER PUBLICATIONS

Japanese Notification of Reasons for refusal dispatched Oct. 21, 2014, along with its English translation, from corresponding Japanese Patent Application No. 2013-537417.
(Continued)

*Primary Examiner* — Noah Wiese
(74) *Attorney, Agent, or Firm* — DLA Piper LLP (US)

(57) ABSTRACT

An annealing separator for a grain oriented electrical steel sheet does not inhibit the flowability of an atmospheric gas during the final annealing of the coil-shaped product and can prevent the occurrence of surface roughness. The annealing separator contains 0.01-0.05 mass % of Cl, 0.05-0.15 mass % of B, 0.1-2 mass % of CaO and 0.03-1.0 mass % of $P_2O_3$, and is mainly composed of magnesia having: a degree of activity of citric acid of 30-120 seconds as measured at 40% CAA; a specific surface area of 8-50 $m^2/g$ as measured by a BET method; an amount of hydration of 0.5-5.2 mass % as measured in terms of ignition loss; and a content of particles each having a particle diameter of 45 μm or more of 0.1 mass % or less, the annealing separator further containing a water-insoluble compound having a particle diameter of 45-150 μm inclusive in an amount of 0.05-20 mass % inclusive.

2 Claims, 2 Drawing Sheets

(51) Int. Cl.

| | |
|---|---|
| ***C21D 1/68*** | (2006.01) |
| ***C21D 8/12*** | (2006.01) |
| ***C22C 38/00*** | (2006.01) |
| ***C22C 38/60*** | (2006.01) |
| ***H01F 1/18*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |

(52) U.S. Cl.

CPC ............ *C22C 38/001* (2013.01); *C22C 38/008* (2013.01); *C22C 38/02* (2013.01); *C22C 38/04* (2013.01); *C22C 38/06* (2013.01); *C22C 38/08* (2013.01); *C22C 38/60* (2013.01); *H01F 1/18* (2013.01)

(56) References Cited

U.S. PATENT DOCUMENTS

| | | | | |
|---|---|---|---|---|
| 2004/0040627 | A1* | 3/2004 | Toutsuka et al. | 148/27 |
| 2009/0047537 | A1* | 2/2009 | Nanba et al. | 428/545 |

FOREIGN PATENT DOCUMENTS

| | | | |
|---|---|---|---|
| JP | 54-14566 | | 6/1979 |
| JP | 61-79781 | | 4/1986 |
| JP | 04-74871 | | 3/1992 |
| JP | 2001-303258 | | 10/2001 |
| JP | 2001-303259 | A | 10/2001 |
| JP | 2004-238668 | | 8/2004 |
| JP | 2008-127635 | A | 6/2008 |
| WO | 2008/047999 | A1 | 4/2008 |

OTHER PUBLICATIONS

Chinese Office Action dated Mar. 2, 2015 of corresponding Chinese Application No. 201280048935.6 along with its English translation.

Notice of Grounds for Rejection dated Mar. 25, 2015 of corresponding KR Application No. 2014-7010560 along with its English translation.

Office Action dated Jun. 4, 2015 of corresponding Russian Patent Application No. 2014117732 along with an English translation.

Supplemental European Search Report dated Jul. 1, 2015 of corresponding European Application No. 12838151.4.

* cited by examiner

ANNEALING SEPARATOR FOR GRAIN-ORIENTED ELECTROMAGNETIC STEEL SHEET

TECHNICAL FIELD

This disclosure relates to annealing separators used to produce grain oriented electrical steel sheets.

BACKGROUND

A general process of producing grain oriented electrical steel sheet involves: preparing a steel slab with a predetermined chemical composition; subjecting the steel slab to hot rolling and cold rolling to form a steel sheet; then subjecting the steel sheet to decarburization annealing; and subjecting the steel sheet to subsequent final annealing for secondary recrystallization. Secondary recrystallization occurs during the final annealing among these process steps to generate coarse grains with their easy magnetization axes aligned in the rolling direction, with the result that excellent magnetic properties can be obtained. Since this final annealing is performed on a coiled steel sheet over a long period of time, it is a common practice to apply to the steel sheet prior to the final annealing, an annealing separator mainly composed of magnesia, the annealing separator being applied as a slurry obtained by suspending the annealing separator with water to prevent sticking of inner and outer wraps of the coiled steel sheet.

In addition to serving as such an annealing separator, the magnesia also serves to react with an oxide layer mainly composed of $SiO_2$, which layer is formed on a surface of the steel sheet during the decarburization annealing (primary recrystallization annealing) prior to the final annealing, to thereby form a forsterite ($Mg_2SiO_4$) film on the surface. It is very difficult to form a uniform forsterite film by coil annealing, and various proposals have been made to this end.

For example, JP 54-014566 B2 proposes a method of forming a uniform film, in which magnesia containing, in an amount of 1% to 20%, the particles passing through a 100-mesh sieve, but not through a 325-mesh sieve (44 μm to 150 μm) is used as an annealing separator to prevent sticking of wraps of a coiled steel sheet and improve the gas flowability in the coil.

We observed, however, in JP 54-014566 B2, the following problems: magnesia containing, in an amount 1% to 20%, the particles passing through a 100-mesh sieve, but not through a 325-mesh sieve (44 μm to 150 μm) is indeed very effective in forming a uniform forsterite film, but may cause surface roughness due to local projections formed on a surface of the forsterite film. This surface roughness also causes a reduction in the stacking factor in stacking products, as well as film defects due to dropping of the aforementioned projections.

It could therefore be helpful to provide an annealing separator for a grain oriented electrical steel sheet which does not inhibit the flowability of an atmospheric gas during the final annealing of the coil-shaped product and can prevent the occurrence of surface roughness.

SUMMARY

We thus provide:

[1] An annealing separator for a grain oriented electrical steel sheet comprising: Cl: 0.01 mass % to 0.05 mass %; B: 0.05 mass % to 0.15 mass %; CaO: 0.1 mass % to 2 mass %; and $P_2O_3$: 0.03 mass % to 1.0 mass %, the annealing separator being mainly composed of magnesia having: a degree of activity of citric acid of 30 seconds to 120 seconds as measured at 40% CAA; a specific surface area of 8 $m^2/g$ to 50 $m^2/g$ as measured by a BET method; an amount of hydration of 0.5 mass % to 5.2 mass % as measured in terms of ignition loss; and a content of particles each having a particle diameter of 45 μm or more of 0.1 mass % or less, the annealing separator further containing a water-insoluble compound having a particle diameter of 45 μm or more to 150 μm or less in an amount of 0.05 mass % or more to 20 mass % or less.

As used herein, the term "citric acid activity" represents a reaction activity measured between citric acid and MgO, specifically, the time measured from when MgO is charged with stirring at a final reactive equivalent weight of 40%, namely at a CAA (Citric Acid Activity) of 40%, to a 0.4 N citric acid aqueous solution at a temperature of 30° C. until the final reaction occurs, i.e., the time it takes that the citric acid is consumed so as to have the solution neutral. The reaction time thus measured is used to evaluate the degree of activity of MgO.

The specific surface area as measured by a BET method represents a surface area of powder that is determined on the basis of the single-point gas ($N_2$) adsorption measured by a BET method.

The amount of hydration as measured in terms of ignition loss, which represents a weight loss percentage at the time of heating MgO to the temperature of 1000° C., may be primarily used to estimate the content of $Mg(OH)_2$ contained in minute amounts in MgO.

[2] The annealing separator for a grain oriented electrical steel sheet according to the aspect [1], wherein the water-insoluble compound is an oxide, and the oxide is an oxide of at least one element selected from Al, Si, P, Ti, Cr, Mn, Fe, Co, Ni, Cu, Zn, and Ga, or a composite oxide of the oxide of the at least one element and MgO.

The annealing separator allows for easy formation of a uniform and smooth forsterite film and, therefore, may make a significant contribution to the production of a grain oriented electrical steel sheet that has a high stacking factor and excellent film properties.

BRIEF DESCRIPTION OF THE DRAWINGS

Our steel sheets and methods will be further described below with reference to the accompanying drawings, wherein.

DETAILED DESCRIPTION

Our steel sheets and methods will now be specifically described below.

In the final annealing, surface roughness was observed on a surface of a forsterite film due to projections, mostly Mg oxides, which were estimated to have been formed by coarse grains contained in the magnesia being adhered and fixed to a surface of the steel sheet as a part of the forsterite film. We investigated how to form a uniform film over the entire length of a coil while reducing surface roughness. We found an intended film may be formed by, after properly controlling the powder properties of magnesia and the amount of impurities in magnesia used as a main component of an annealing separator, reducing coarse grains contained in the magnesia and adding, as a spacer to maintain gas flowability, a water-insoluble compound other than the magnesia, to the annealing separator.

One example of the experiments, on which the aforementioned discoveries are based, will be described hereinafter.

That is, magnesia samples were prepared with different power properties and different particle size distributions, and applied to the production of grain oriented electrical steel sheets.

Specifically, a silicon steel slab, containing C: 0.04 mass % to 0.05 mass %, Si: 3.3 mass % to 3.4 mass %, Mn: 0.06 mass % to 0.075 mass %, Al: 0.02 mass % to 0.03 mass %, Se: 0.018 mass % to 0.020 mass %, Sb: 0.04 mass % to 0.05 mass %, N: 0.007 mass % to 0.010 mass %, and the balance being Fe and incidental impurities, was heated to 1350° C. and soaked for 18000 seconds, subjected to hot rolling to obtain a hot-rolled steel sheet having a thickness of 2.2 mm, subjected to hot band annealing at 1100° C. for 60 seconds, and subjected to warm rolling at 200° C. to be finished to a final sheet thickness of 0.23 mm by a Sendzimir mill.

The steel sheets thus obtained were subjected to decarburization annealing. Subsequently, annealing separators, which were obtained by adding 5 parts by weight of titania ($TiO_2$) to 100 parts by weight of various magnesia powder samples having different particle size distributions, were hydrated at a hydration temperature of 20° C. over a hydration time of 2400 seconds and applied on both surfaces of the steel sheets with a coating weight of 15 g/m$^2$ as a total for both surfaces, and then dried thereon. After that, the steel sheets were wound into coils, which were then subjected to final annealing, applied with insulating tension coating, and were subjected to subsequent heat treatment at 860° C. for 60 seconds for the purposes of both baking and flattening. It should be noted that the content of particles each having a particle diameter of 45 μm or more in the titania added to each of the annealing separators was less than 0.01 mass % based on the total mass of titania.

Figure 1:
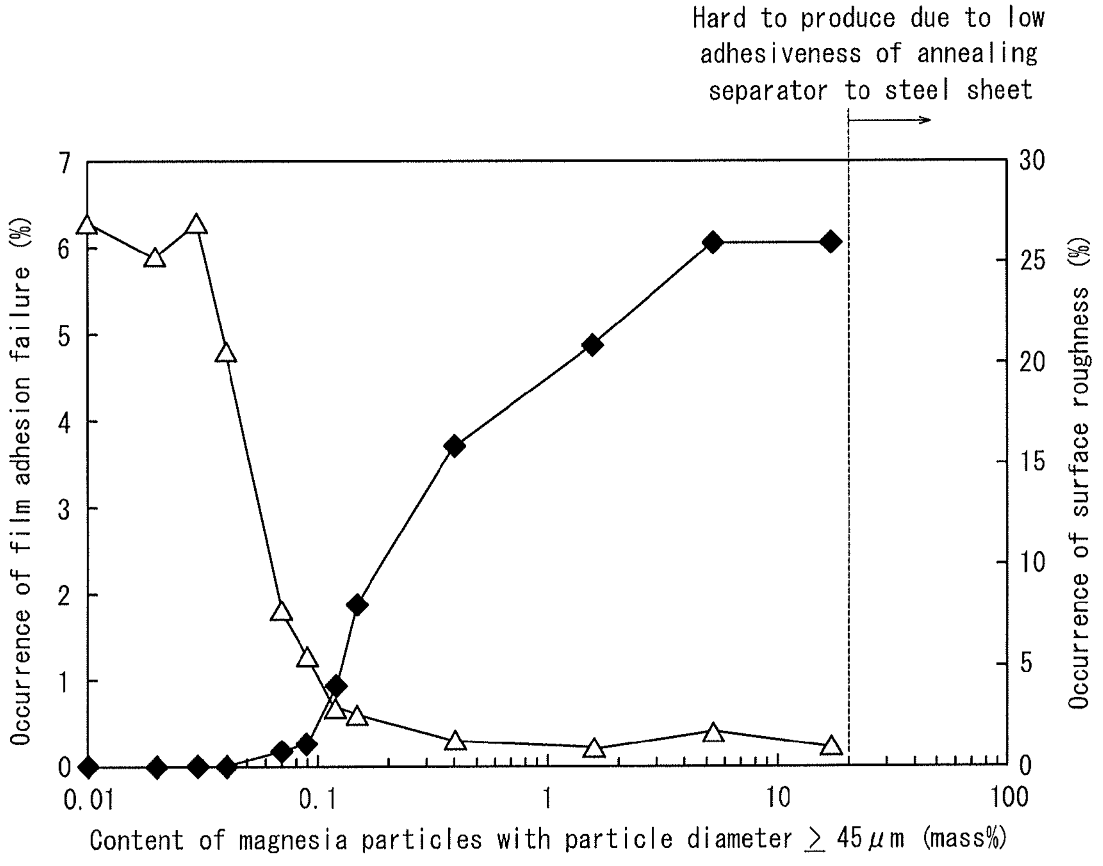
FIG. 1 is a graph showing the relationship among the content of magnesia particles each having a particle diameter of 45 μm or more, the surface roughness, and the occurrence of film adhesion failure.

Analysis of the experimental results, as shown in FIG. 1, revealed that the occurrence of surface roughness may be mitigated by having the content of particles with a particle diameter of 45 μm or more in magnesia controlled to be equal to or less than 0.1 mass %. We also found, however, that when the content of magnesia particles each having a particle diameter of 45 μm or more is reduced to 0.1 mass % or less, the resulting film becomes more prone to adhesion failure. This adhesion failure occurred excessively around the coil bottom portion during the final annealing, and it was estimated that the flowability of the gas into the coil was reduced during the final annealing due to the absence of coarse magnesia particles. Flowability of the gas is reduced because the atmospheric gas mainly flows into the coil from the top as the bottom portion of the coil is in contact with the furnace hearth, with the result that the gas flow through layers of the coiled steel sheet may be suppressed even with a minor reduction in the distance among the layers, which may therefore affect the film formation.

Figure 2:
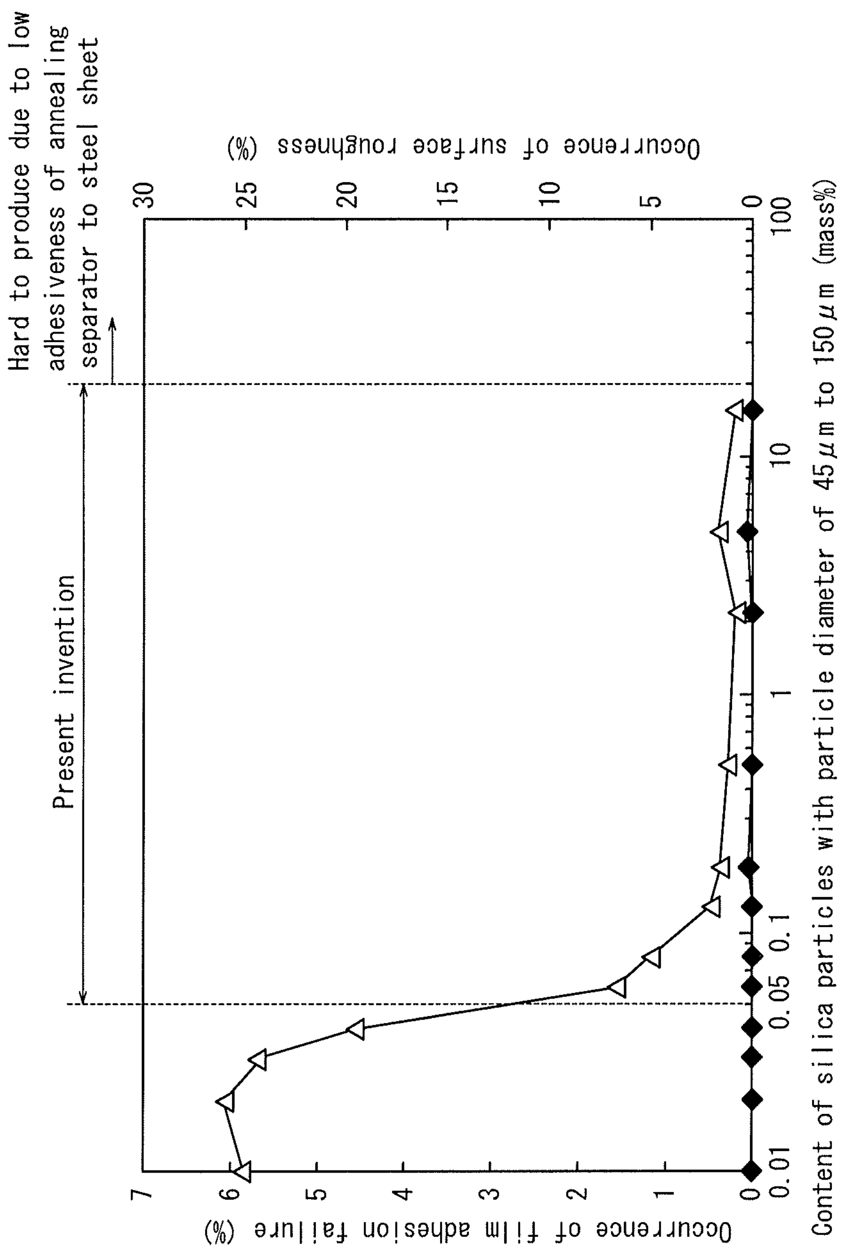
FIG. 2 is a graph showing the relationship among the content of silica particles each having a particle diameter of 45 μm to 150 μm, the surface roughness, and the occurrence of film adhesion failure.

To address this problem, we focused on the spacer effect provided by coarse magnesia particles and obtained this spacer effect with a water-insoluble compound other than magnesia. Silica samples having different particle size distributions were added as water-insoluble compounds to the annealing separators used in the aforementioned experiments (with a content of particles each having a particle diameter of 45 μm or more in magnesia: 0.1 mass %). Then, we found that the addition of 0.05 mass % or more of silica having a particle diameter of 45 μm or more to 150 μm or less to an annealing separator may suppress both surface roughness and other film defects at the same time, as shown in FIG. 2. The effect resulting from the addition of silica samples with a particle diameter of 45 μm or more to 150 μm or less was also obtained in oxides of, for example, Al, Si, P, Ti, Cr, Mn, Fe, Co, Ni, Cu, Zn, and Ga.

To obtain the effect intended, the following conditions need to be satisfied in the first place on the content of each component added to magnesia and the powder properties of the magnesia. The effect may be achieved by the use of such magnesia that satisfies the requirements identified below. That is, using magnesia having a proper degree of activity and ensuring gas flowability during final annealing are essential to obtain the effect.

First, the content of each component added to magnesia will be described in turn.

Cl: 0.01 Mass % to 0.05 Mass %

Chlorine (Cl) is an element that facilitates film formation. That is, a Cl content of less than 0.01 mass % does not achieve sufficient film formation, while a Cl content of more than 0.05 mass % forms an excessively thick film and leads to point-like defects. In either case, good film properties cannot be obtained. Accordingly, the content of Cl is 0.01 mass % to 0.05 mass %, and more preferably 0.015 mass % to 0.4 mass %.

B: 0.05 Mass % to 0.15 Mass %

Boron (B) is an element that facilitates film formation. That is, a B content of less than 0.05 mass % does not achieve sufficient film formation, while a B content of more than 0.15 mass % forms an excessively thick film and leads to point-like defects. In either case, good film properties cannot be obtained. Accordingly, the content of B is 0.05 mass % to 0.15 mass %, and more preferably 0.07 mass % to 0.13 mass %.

CaO: 0.1 Mass % to 2 Mass %

CaO is a compound that restrains film formation and affects the form of the resulting film. That is, a CaO content of less than 0.1 mass % smoothes out irregularities on the interface between the steel substrate and the film and the resulting film becomes more prone to exfoliation, while a CaO content of more than 2 mass % does not achieve sufficient film formation. In either case, good film properties cannot be obtained. Accordingly, the content of CaO is 0.1 mass % to 2 mass %, and more preferably 0.2 mass % to 1.0 mass %.

$P_2O_3$: 0.03 Mass % to 1.0 Mass %

$P_2O_3$ is a compound that facilitates film formation. That is, a $P_2O_3$ content of less than 0.03 mass % does not achieve sufficient film formation, while a $P_2O_3$ content of more than 1.0 mass % forms an excessively thick film and leads to point-like defects. In either case, good film properties cannot be obtained. Accordingly, the content of $P_2O_3$ is 0.03 mass % to 1.0 mass %, and more preferably 0.15 mass % to 0.7 mass %.

The annealing separator includes the aforementioned components and the balance of the magnesia consists of incidental impurities and MgO. Examples of the incidental impurities include S, Si, Fe, and Al. Note that well-known additive components may be added to the annealing separator at impurity level to allow for minute adjustment of the degree of reactivity of the annealing separator.

In addition, the following properties are important for the magnesia.

Degree of Activity of Citric Acid (40% CAA): 30 Seconds to 120 Seconds

When the aforementioned degree of activity of citric acid is less than 30 seconds, the amount of hydration becomes too large, or when it is over 120 seconds, the degree of activity becomes too low; in either case, good film properties cannot be obtained. The degree of activity of citric acid is more preferably in the range of 50 seconds to 100 seconds.

Specific Surface Area Measured by the BET Method: 8 $m^2/g$ to 50 $m^2/g$

When the aforementioned specific surface area measured by the BET method is more than 50 $m^2/g$, the amount of hydration of the magnesia becomes too large, or when it is less than 8 $m^2/g$, the degree of reactivity becomes too low. In either case, good film properties cannot be obtained. The specific surface area is more preferably 15 $m^2/g$ to 35 $m^2/g$.

The Amount of Hydration in Terms of Ignition Loss: 0.5 Mass % to 5.2 Mass %

When the aforementioned amount of hydration as measured in terms of ignition loss is less than 0.5 mass %, the degree of reactivity becomes too low, or when it is more than 5.2 mass %, hydration water in the magnesia oxidizes the steel sheet during the final annealing; in either case good film properties cannot be obtained. The amount of hydration is more preferably 0.8 mass % to 2.0 mass %.

The Content of Magnesia Particles Each Having a Particle Diameter of 45 μm or More: 0.1 Mass % or Less When the content of magnesia particles each having a particle diameter of 45 μm or more is more than 0.1 mass %, the resulting forsterite film becomes more prone to surface roughness. The content of magnesia particles each having a particle diameter of 45 μm or more is more preferably 0.06 mass % or less. An easiest way of controlling the content of such magnesia particles to fall within this range is to remove coarse magnesia particles using a sieve. In addition, a rotary kiln may be used to facilitate the control of the particle diameter of magnesia particles in the magnesia to be produced. Note that the content of magnesia particles each having a particle diameter of 45 μm or more may be reduced to 0 mass %.

It is important to add, in addition to the aforementioned magnesia, a water-insoluble compound to our annealing separator, in the manner described below.

The Content of Water-Insoluble Compound Particles Each Having a Particle Diameter of 45 μm or More and 150 μm or Less: 0.05 Mass % or More and 20 Mass % or Less Since the annealing separator is applied as a slurry to the steel sheet, the compound added to the annealing separator must be water-insoluble. As used herein, the term "water-insoluble composition" refers to such a composition dissolved in water at 20° C. in an amount of 1.0 mass % or less based on the amount of the compound charged.

First, it is necessary for this water-insoluble compound to have a particle diameter of 45 μm or more and 150 μm or less. That is, those particles having a particle diameter of less than 45 μm function less effectively as spacers, whereas those having a particle diameter of larger than 150 μm causes pressing flaws in the steel sheet.

Second, when the content of the aforementioned water-insoluble compound is less than 0.05 mass %, the gas flowability during the final annealing deteriorates, making it difficult to form a uniform film. On the other hand, when the content of the water-insoluble compound is more than 20 mass %, the resulting annealing separator becomes significantly less adhesive to the steel sheet, making it difficult to allow for industrial production of steel sheets. The content of the water-insoluble compound is more preferably 0.1 mass % or more to 2.0 mass % or less. It is even more preferable, in terms of preventing pressing flaws in the steel sheet, to control the content of water-insoluble compound particles each having a particle diameter 45 μm or more to 75 μm or less, to fall within the range of 0.1 mass % or more to 2.0 mass % or less.

Note that the content of the water-insoluble compound is defined by percent by mass based on 100 mass % of the annealing separator.

Coarse particles of the water-insoluble compound to be controlled are difficult to be measured precisely by a particle size distribution measuring device using a general laser scattering scheme. Accordingly, the content of water-insoluble compound particles is defined on the basis of the sieve residue. Specifically, a particle having a particle diameter of 45 μm or more is defined as the one that does not pass through a standard 330-mesh sieve, and a particle having a particle diameter of 75 μm or less and a particle having a particle diameter of 150 μm or less are each defined as those passing through standard 200-mesh and 100-mesh sieves, respectively.

Further, the aforementioned water-insoluble compound, which is required to serve as a spacer between layers of a coiled steel sheet, needs to have a certain degree of hardness.

For example, the use of an oxide offers the aforementioned intended effect. However, magnesia tends to adhere to the steel sheet as a result of reacting with silica present in a surface layer of the steel sheet, which makes it difficult to use magnesia for this purpose. In other words, the oxide is preferably an oxide of one ore more element selected from Al, Si, P, Ti, Cr, Mn, Fe, Co, Ni, Cu, Zn, and Ga. For example, $SiO_2$, $Al_2O_3$, and $TiO_2$ are also beneficial in terms of cost because they are inexpensive and readily available. A composite oxide of the aforementioned oxide and MgO may also be successfully used. Examples of the composite oxide include, for example, $MgAl_2O_4$, $Mg_2SiO_4$, $MgP_2O_6$, and $Mg_2TiO_4$. These compounds are less reactive with silica and do not cause film defects.

In producing a grain oriented electrical steel sheet, an auxiliary agent such as $TiO_2$ is often added to the annealing separator. Such an auxiliary agent is added for the purpose of reaction with MgO and with oxides on a surface of the steel sheet and, thus, are preferably made as fine as possible to have a particle diameter equal to or smaller than that of MgO particles. Generally, these auxiliary agents do not contain coarse particles as large as 45 μm or more. To obtain the desired effect, however, it is necessary to intentionally prepare coarse water-insoluble compound particles each having a particle diameter of 45 μm or more and add the compound particles thus prepared to the annealing separator for use.

EXAMPLE 1

Steel slabs, each containing C: 0.05 mass % to 0.07 mass %, Si: 3.2 mass % to 3.5 mass %, Mn: 0.06 mass % to 0.075 mass %, Al: 0.02 mass % to 0.03 mass %, Se: 0.018 mass % to 0.021 mass %, Sb: 0.02 mass % to 0.03 mass %, and N: 0.007 mass % to 0.009 mass %, and the balance being Fe and incidental impurities, were prepared, heated to 1350° C. and soaked for 1800 seconds, subjected to hot rolling to obtain steel sheets each having a sheet thickness of 2.2 mm, subjected to hot band annealing at 1000° C. for 60 seconds, subjected to intermediate annealing at 1050° C. for 60 seconds after the first cold rolling, and subjected to subsequent warm rolling at 210° C. using a tandem mill to be finished to a sheet thickness of 0.23 mm. The steel sheets were then subjected to decarburization annealing. Subsequently, annealing separators, which were obtained by adding 8.5 parts by weight of titanium oxide, 1.5 parts by weight of strontium sulfate, and 0.5 parts by weight of silica to 100 parts by weight of different magnesia samples as shown in Table 1, respectively, were hydrated at a hydration temperature of 20° C. over a hydration time of 2400 seconds and applied to the steel sheets with a coating weight of 13 g/$m^2$ (as a total for both surfaces), respectively, and then dried thereon.

In this case, regarding the silica added to the annealing separators, a standard sieve was used to sort silica particles having a particle diameter of 45 μm or more to 150 μm or less. Note that the content of the silica in each of the annealing separators was 0.45 mass %. In addition, regarding the titanium oxide and strontium sulfate added to the annealing separators, the content of particles each having a particle diameter of 45 μm or more was 0.01 mass % or less, respectively, and particles having a substantial particle diameter of less than 45 μm were used, respectively.

Then, the steel sheets were wound into coils, which in turn were subjected to final annealing. After that, the steel sheets were applied with insulating coating, subjected to heat treatment at 860° C. for 60 seconds for the purposes of both baking and heat flattening, and subjected to subsequent magnetic domain refining treatment by means of electron beam irradiation.

The results of investigations on the film properties of the steel sheets thus obtained are also shown in Table 1. It can be seen from the table that the annealing separators provide excellent film properties.

TABLE 1

| | Magnesia | | | | | | | | | | |
|---|---|---|---|---|---|---|---|---|---|---|---|
| No. | Cl (mass %) | B (mass %) | CaO (mass %) | $P_2O_3$ (mass %) | 40% CAA (sec) | BET ($m^2$/g) | Ignition Loss (mass %) | Content of Particles with Particle Diameter ≥45 μm (mass %) | Occurrence of Surface Roughness (%) | Film Property | Remarks |
| 1 | 0.03 | 0.08 | 0.4 | 0.19 | 72 | 24 | 1.4 | 0.01 | 0 | Good | Present Invention |
| 2 | 0.04 | 0.12 | 0.7 | 0.26 | 81 | 22 | 1.1 | 0.07 | 0 | Good | Present Invention |
| 3 | 0.01 | 0.09 | 0.3 | 0.12 | 62 | 28 | 1.5 | 0.04 | 0 | Good (albeit slightly non-uniform) | Present Invention |
| 4 | 0.05 | 0.01 | 0.5 | 0.08 | 53 | 32 | 1.8 | 0.05 | 0 | Good (albeit slightly non-uniform) | Present Invention |
| 5 | 0.04 | 0.05 | 0.9 | 0.35 | 84 | 20 | 1.2 | 0.02 | 0 | Good (albeit slightly non-uniform) | Present Invention |
| 6 | 0.03 | 0.15 | 0.8 | 0.29 | 79 | 23 | 1.2 | 0.01 | 0 | Good (albeit slightly non-uniform) | Present Invention |
| 7 | 0.02 | 0.06 | 0.1 | 0.41 | 83 | 21 | 1.1 | 0.03 | 0 | Good (albeit slightly non-uniform) | Present Invention |
| 8 | 0.03 | 0.09 | 2 | 0.15 | 71 | 22 | 1.3 | 0.04 | 0 | Good (albeit slightly non-uniform) | Present Invention |
| 9 | 0.04 | 0.12 | 0.2 | 0.03 | 69 | 29 | 1.7 | 0.04 | 0 | Good (albeit slightly non-uniform) | Present Invention |
| 10 | 0.03 | 0.11 | 0.4 | 1 | 74 | 24 | 1.2 | 0.02 | 0 | Good (albeit slightly non-uniform) | Present Invention |
| 11 | 0.04 | 0.09 | 0.8 | 0.23 | 30 | 45 | 5.1 | 0.03 | 0 | Good (albeit slightly non-uniform) | Present Invention |
| 12 | 0.04 | 0.12 | 0.2 | 0.33 | 120 | 9 | 0.7 | 0.02 | 0 | Good (albeit slightly non-uniform) | Present Invention |
| 13 | 0.03 | 0.11 | 0.6 | 0.04 | 59 | 31 | 2.3 | 0.2 | 2.5 | Surface Roughness Observed | Comparative Example |
| 14 | 0.03 | 0.08 | 0.5 | 0.03 | 72 | 25 | 0.9 | 1.6 | 18 | Surface Roughness Observed | Comparative Example |
| 15 | 0.005 | 0.11 | 0.2 | 0.06 | 56 | 36 | 2.2 | 0.02 | 0 | Adhesion Failure | Comparative Example |
| 16 | 0.07 | 0.09 | 0.3 | 0.09 | 61 | 29 | 1.6 | 0.03 | 0 | Point-like Defects | Comparative Example |
| 17 | 0.04 | 0.02 | 0.5 | 0.12 | 59 | 34 | 1.9 | 0.01 | 0 | Adhesion Failure | Comparative Example |
| 18 | 0.03 | 0.21 | 0.2 | 0.07 | 82 | 19 | 1.1 | 0.02 | 0 | Point-like Defects | Comparative Example |
| 19 | 0.04 | 0.12 | 0.02 | 0.05 | 89 | 18 | 0.9 | 0.02 | 0 | Point-like Defects | Comparative Example |
| 20 | 0.03 | 0.09 | 3.2 | 0.16 | 91 | 19 | 0.8 | 0.01 | 0 | Thin Film | Comparative Example |
| 21 | 0.03 | 0.13 | 0.8 | 0.01 | 79 | 25 | 1.1 | 0.01 | 0 | Adhesion Failure | Comparative Example |
| 22 | 0.03 | 0.11 | 0.6 | 1.6 | 62 | 24 | 12 | 0.01 | 0 | Point-like Defects | Comparative Example |
| 23 | 0.04 | 0.08 | 0.3 | 0.32 | 21 | 59 | 6.5 | 0.02 | 0 | Adhesion Failure | Comparative Example |
| 24 | 0.03 | 0.12 | 0.9 | 0.19 | 142 | 5 | 0.3 | 0.01 | 0 | Thin Film | Comparative Example |

EXAMPLE 2

Steel slabs, each containing C: 0.05 mass % to 0.09 mass %, Si: 3.2 mass % to 3.5 mass %, Mn: 0.06 mass % to 0.075 mass %, Al: 0.02 mass % to 0.03 mass %, Se: 0.018 mass % to 0.021 mass %, Sb: 0.02 mass % to 0.03 mass %, N: 0.007 mass % to 0.009 mass %, Ni: 0.1 mass % to 0.5 mass %, Sn: 0.02 mass % to 0.12 mass %, and the balance being Fe and incidental impurities, were prepared, heated to 1380° C. and soaked for 2100 seconds, subjected to hot rolling to obtain steel sheets each having a sheet thickness of 2.1 mm, subjected to hot band annealing at 1050° C. for 60 seconds, subjected to intermediate annealing at 1070° C. for 60 seconds after the first cold rolling, and subjected to subsequent warm rolling at 190° C. using a tandem mill to be finished to a sheet thickness of 0.23 mm. The steel sheets were then subjected to decarburization annealing. Subsequently, annealing separators, which were obtained by adding 6.1 parts by weight of titanium oxide, 2.2 parts by weight of strontium hydroxide, and different coarse water-insoluble compounds shown in Table 2 to 100 parts by weight of the magnesia sample labeled as No. 1 in Table 1, respectively, were hydrated at a hydration temperature of 20° C. over a hydration time of 2200 seconds and applied to the steel sheets with a coating weight of 15 g/$m^2$ (as a total for both surfaces), respectively, and then dried thereon.

In addition, regarding the titanium oxide and strontium sulfate added to the annealing separators separately from those compounds shown in Table 2, the content of particles having a particle diameter of 45 μm or more was 0.01 mass % or less, respectively. Then, the steel sheets were wound into coils and subjected to final annealing. After that, the steel sheets were applied with insulating coating, subjected to heat treatment at 860° C. for 60 seconds for the purposes of both baking and heat flattening, and subjected to subsequent magnetic domain refining treatment by means of electron beam irradiation.

The results of investigations on the film properties of the steel sheets thus obtained are also shown in Table 2. It can be seen from the table that our annealing separators provide excellent film properties.

TABLE 2

| No. | Water-insoluble Compound | Content of Particles *1 (mass %) | Film Property | Remarks |
|---|---|---|---|---|
| 1 | $SiO_2$ | 0.01 | Adhesion Failure | Comparative Example |
| 2 | $SiO_2$ | 0.08 | Good (albeit slightly non-uniform) | Inventive Example |
| 3 | $SiO_2$ | 0.31 | Good | Inventive Example |
| 4 | $SiO_2$ | 1.8 | Good | Inventive Example |
| 5 | $SiO_2$ | 5.2 | Good (albeit slightly non-uniform) | Inventive Example |
| 6 | $SiO_2$ | 11.4 | Good (albeit slightly non-uniform) | Inventive Example |
| 7 | $SiO_2$ | 25 | Unable to produce due to excessive exfoliation of separator | Comparative Example |
| 8 | $Al_2O_3$ | 0.45 | Good | Inventive Example |
| 9 | $TiO_2$ | 0.68 | Good | Inventive Example |
| 10 | MgO | 0.88 | Surface Roughness Observed | Comparative Example |
| 11 | $Mg_2SiO_4$ | 0.71 | Good | Inventive Example |
| 12 | $MgAl_2O_4$ | 0.56 | Good | Inventive Example |
| 13 | $MgP_2O_6$ | 0.42 | Good | Inventive Example |
| 14 | $Mg_2TiO_4$ | 0.77 | Good | Inventive Example |
| 15 | $Cr_2O_3$ | 0.83 | Good | Inventive Example |
| 16 | $MnO_2$ | 1.12 | Good | Inventive Example |
| 17 | $Fe_2O_3$ | 0.56 | Good | Inventive Example |
| 18 | CoO | 1.43 | Good | Inventive Example |
| 19 | NiO | 1.27 | Good | Inventive Example |
| 20 | CuO | 0.86 | Good | Inventive Example |
| 21 | ZnO | 0.99 | Good | Inventive Example |
| 22 | $Ga_2O_3$ | 1.82 | Good | Inventive Example |
| 23 | $SiO_2:Al_2O_3 = 1:1$ | 0.45 | Good | Inventive Example |
| 24 | $SiO_2:TiO_2 = 1:1$ | 0.82 | Good | Inventive Example |

*1 Content of particles with a particle diameter of 45 μm or more and 150 μm or less.

The invention claimed is:

1. An annealing separator for a grain oriented electrical steel sheet comprising: Cl: 0.01 mass % to 0.05 mass %; B: 0.05 mass % to 0.15 mass %; CaO: 0.1 mass % to 2 mass %; and $P_2O_3$: 0.03 mass % to 1.0 mass %, the annealing separator mainly composed of magnesia having: a degree of activity of citric acid of 30 seconds to 120 seconds as measured at 40% CAA; a specific surface area of 8 $m^2/g$ to 50 $m^2/g$ as measured by a BET method; an amount of hydration of 0.5 mass % to 5.2 mass % as measured in terms of ignition loss; and a content of magnesia particles each having a particle diameter of 45 μm or more of 0.1 mass % or less, the annealing separator further containing a water-insoluble compound having a particle diameter of 45 μm or more to 150 μm or less in an amount of 0.05 mass % or more to 20 mass % or less.

2. The annealing separator according to claim 1, wherein the water-insoluble compound is an oxide, and the oxide is an oxide of at least one element selected from the group consisting of Al, Si, P, Ti, Cr, Mn, Fe, Co, Ni, Cu, Zn, and Ga, or a composite oxide of the oxide of the at least one element and MgO.

* * * * *